(12) United States Patent
Li et al.

(10) Patent No.: US 6,654,499 B2
(45) Date of Patent: Nov. 25, 2003

(54) METHOD AND APPARATUS FOR ENCODING AND DECODING IMAGES

(75) Inventors: Weiping Li, Bethlehem, PA (US); Shipeng Li, Hightstown, NJ (US); Hangqiao Sun, Bethlehem, PA (US)

(73) Assignee: Competitive Technologies of Pa, Inc., Bethlehem, PA (US)

( * ) Notice: Subject to any disclaimer, the term of this patent is extended or adjusted under 35 U.S.C. 154(b) by 0 days.

(21) Appl. No.: 10/160,628

(22) Filed: Jun. 3, 2002

(65) Prior Publication Data

US 2003/0012443 A1 Jan. 16, 2003

Related U.S. Application Data

(60) Continuation of application No. 09/645,240, filed on Aug. 24, 2000, now Pat. No. 6,400,847, which is a division of application No. 08/884,440, filed on Jun. 27, 1997, now Pat. No. 6,144,771.
(60) Provisional application No. 60/020,776, filed on Jun. 28, 1996.

(51) Int. Cl.[7] .................................................. G06K 9/36
(52) U.S. Cl. ...................................................... 382/232
(58) Field of Search ................................. 382/232, 236, 382/238, 240, 242, 248, 250; 348/384.1, 394.1, 395.1, 400.1–404.1, 402.1–416.1, 420.1, 421.1, 425.2, 430.1, 431.1

(56) References Cited

U.S. PATENT DOCUMENTS

| | | | |
|---|---|---|---|
| 4,589,142 A | 5/1986 | Bednar | 382/37 |
| 5,257,328 A | 10/1993 | Shimizu | 382/61 |
| 5,436,985 A | 7/1995 | Li | 382/253 |
| 5,440,345 A | 8/1995 | Shimoda | 348/411 |
| 5,592,569 A | 1/1997 | Li | 382/253 |
| 5,659,631 A | 8/1997 | Gormish et al. | 382/166 |
| 5,748,780 A | 5/1998 | Stolfo | 382/232 |
| 5,799,110 A | 8/1998 | Israelsen et al. | 382/253 |
| 5,822,465 A | 10/1998 | Normile et al. | 382/253 |
| 5,883,981 A | 3/1999 | Li et al. | 382/253 |
| 5,889,891 A | 3/1999 | Gersho et al. | 382/253 |
| 6,144,771 A | 11/2000 | Li et al. | 382/239 |

Primary Examiner—Jose L. Couso
(74) Attorney, Agent, or Firm—Martin Novack

(57) ABSTRACT

A method of encoding and decoding an image includes the following steps: subsampling the image to obtain a plural number of subsampled frames of spatially offset image-representative signals; transforming each of the subsampled frames to obtain a corresponding number of frames of transform coefficient-representative signals; forming vector-representative signals from corresponding coefficient-representative signals of the respective frames of coefficient-representative signals; transforming the vector-representative signals; quantizing the transformed vector-representative signals to obtain encoded signals; transmitting the encoded signals; receiving the transmitted encoded signals; and decoding the encoded signals to obtain a recovered version of the image.

1 Claim, 5 Drawing Sheets

METHOD AND APPARATUS FOR ENCODING AND DECODING IMAGES

RELATED APPLICATION

This is a continuation of U.S. application Ser. No. 09/645,240 filed Aug. 24, 2000, now U.S. Pat. No. 6,400,847 which was a divisional of Ser. No. 08/884,440 filed Jun. 27, 1997 now U.S. Pat. No. 6,144,771, which claims priority from U.S. Provisional Patent Application No. 60/020,776, filed Jun. 28, 1996.

FIELD OF THE INVENTION

This invention relates to compression of image-representative signals and, more particularly, to a method and apparatus for encoding and decoding image-representative signals.

BACKGROUND OF THE INVENTION

Image-representative signals (e.g. video signals) can be digitized, encoded, and subsequently decoded in a manner which substantially reduces the number of bits necessary to represent a decoded reconstructed image without undue or noticeable degradation in the reconstructed image. Coding methods that use transforms, for example discrete cosine transform ("DCT") or wavelet transforms, are well known and in widespread use. Video compression standards such as JPEG, MPEG-1 MPEG-2, H.261 and H.262 typically employ DCT-based techniques.

Techniques employing vector transform (VT) coding (see, for example, U.S. Pat. No. 5,436,985) can provide substantial improvements in coding efficiency over DCT-based methods used in the above referenced standards. In VT coding, an image (e.g. a video frame, a segmented video frame, or a motion compensated difference frame) is subsampled into multiple small images. Each small image is converted into a different format by using a transform such as the discrete cosine transform or a wavelet transform. The corresponding transform coefficients from the small images are grouped together to form vectors. Vector quantization is used to quantize and code those vectors.

Although techniques such as VT coding are advantageous, service providers can be faced with the problem of needing to retain hardware for encoding DCT-based and wavelet-based signals to serve those users who only have decoder equipment for such signals, while also investing in equipment that can encode the signals of more advanced techniques such as VT coding in order to serve those users who have the more advanced decoder equipment. The problem is analogous from a user standpoint, where a user having only DCT-based and/or wavelet based decoder hardware will be limited in capability of decoding signals encoded with more advanced techniques such as VT coding, whereas purchasers of VT decoding equipment will also want to be able to decode the signals encoded with DCT-based and wavelet-based encoders that will remain in use, but without having to purchase additional equipment for doing so.

It is among the objects of the present invention to provide improvements in encoding and decoding techniques and apparatus that are responsive to the problems just summarized. It is also among the objects of the invention to provide improved coding options and to provide an improved technique and apparatus for entropy coding.

SUMMARY OF THE INVENTION

In a form of the present invention, a method is set forth for decoding an encoded signal that includes an encoded control portion and an encoded video portion, comprising the following steps: providing a plurality of inverse transform functions; decoding the encoded signal to recover said control portion; selecting one of said inverse transform functions in accordance with the recovered control portion; and decoding said encoded video portion with the selected inverse transform function.

In an embodiment of this form of the invention, the inverse transform functions comprise inverse digital cosine transform, inverse wavelet transform, and inverse vector transform. In this embodiment, the control portion specifies the level of wavelet decomposition of wavelet transform and the subsampling factor of said vector transform.

Further features and advantages of the invention will become more readily apparent from the following detailed description when taken in conjunction with the accompanying drawings.

DETAILED DESCRIPTION

Figure 1:
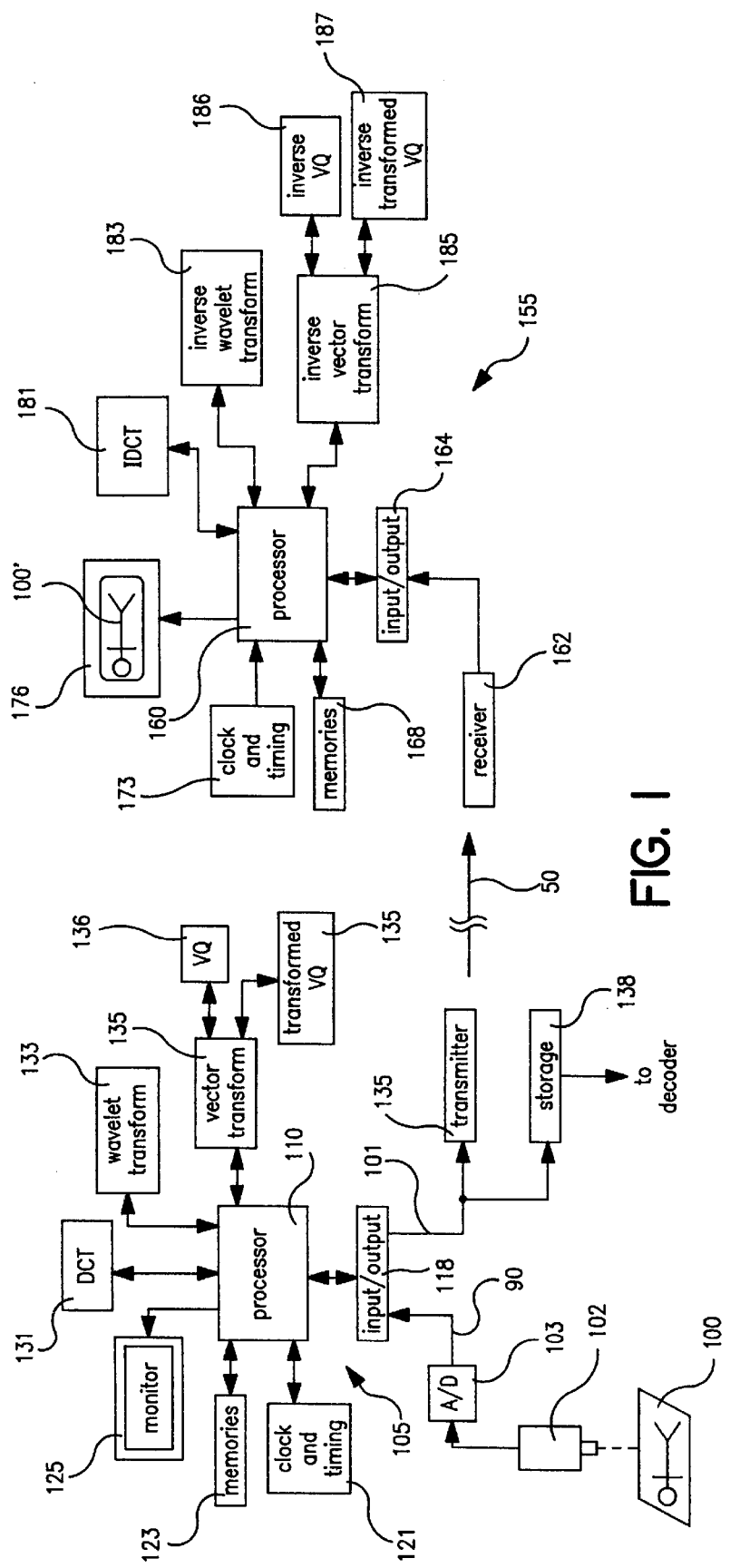
FIG. 1 is a block diagram of an apparatus which can be used to practice embodiments of the invention.

Referring to FIG. 1, there is shown a block diagram of an apparatus which can be used in practicing embodiments of the invention for encoding and decoding images 100. A video camera 102, or other source of video signal, produces an array of pixel-representative signals that are coupled to an analog-to-digital converter 103, which is, in turn, coupled to the processor 110 of an encoder 105. When programmed in the manner to be described, the processor 110 and its associated circuits can be used to implement embodiments of the invention. The processor 110 may be any suitable processor, for example an electronic digital processor or microprocessor. It will be understood that any general purpose or special purpose processor, or other machine or circuitry that can perform the functions described herein, electronically, optically, or by other means, can be utilized. The processor 110, which for purposes of the particular described embodiments hereof can be considered as the processor or CPU of a general purpose electronic digital computer, such as a Model Ultra-1 sold by Sun Microsystems, Inc., will typically include memories 123, clock and timing circuitry 121, input/output functions 118 and monitor 125, which may all be of conventional types. In the present embodiment blocks 131, 133 and 135 represent functions that can be implemented in hardware, software, or a combination thereof. The block 131 represents a digital cosine transform function that can be implemented using commercially available DCT chips or combinations of such chips with known software, and the block 133 represents a wavelet transform that can be implemented using commercially available wavelet transform chips, or combinations of such chips with known software. The block 135 represents a vector transform function that can be implemented in accordance with the routines set forth in U.S. Pat. No. 5,436,985 (incorporated herein by reference) or hardware equivalents. As described in said '985 patent, vector quantization (represented by block 136) is employed as part of the VT coding. The vector quantization can be lattice VQ, for example of the type described in copending U.S. patent application Ser. No. 08/733,849, filed Oct. 18, 1996, and copending U.S. patent application Ser. No. 08/743,631, filed Nov. 4, 1996, both assigned to the same assignee as the present application, and both incorporated herein by reference. A transformed VQ (represented by block 137) is described hereinbelow.

With the processor appropriately programmed, as described hereinbelow, an encoded output signal 101 is produced which is a compressed version of the input signal 90 and requires less bandwidth and/or less memory for storage. In the illustration of FIG. 1, the encoded signal 101 is shown as being coupled to a transmitter 135 for transmission over a communications medium (e.g. air, cable, fiber optical link, microwave link, etc.) 50 to a receiver 162. The encoded signal is also illustrated as being coupled to a storage medium 138, which may alternatively be associated with or part of the processor subsystem 110, and which has an output that can be decoded using the decoder to be described.

Coupled with the receiver 162 is a decoder 155 that includes a similar processor 160 (which will preferably be a microprocessor in decoder equipment) and associated peripherals and circuits of similar type to those described in the encoder. These include input/output circuitry 164, memories 168, clock and timing circuitry 173, and a monitor 176 that can display decoded video 100'. Also provided are blocks 181, 183 and 185 that represent functions which (like their counterparts 131, 133 and 135 in the encoder) can be implemented in hardware, software, or a combination thereof. The block 181 represents an inverse digital cosine transform function that can be implemented using commercially available IDCT chips or combinations of such chips with known software, and the block 183 represents an inverse wavelet transform function that can be implemented using commercially available inverse wavelet transform chips, or combinations of such chips with known software. The block 185 represents an inverse vector transform function that can be implemented in accordance with the routines set forth in the above-referenced U.S. Pat. No. 5,436,985 or hardware equivalents. As described in said '985 patent, inverse vector quantization (represented by block 186) is employed as part of the inverse VT coding. The inverse vector quantization can be inverse lattice VQ, for example of the type described in the above referenced copending U.S. patent application Ser. Nos. 08/733,849 and 08/743,631. An inverse transformed VQ (represented by the block 187) is described hereinbelow.

In order to provide a more universal approach to encoding/decoding wherein, for example in the present embodiment, VT coding is made compatible with the DCT-based and wavelet-based compression techniques, three parameters are introduced and are described as follows:

Level of Decomposition (LD):

This parameter takes an integer value from 0 to MAXLD and indicates the level of wavelet decomposition. When LD=0, it indicates that the DCT is used instead of a wavelet transform. For example, if the maximum level of decomposition is chosen to be MAXLD=7, three bits are needed for coding this parameter as follows:

| LD value | LD code | meaning |
|---|---|---|
| 0 | 000 | use the DCT |
| 1 | 001 | use 1 level of wavelet decomposition |
| 2 | 010 | use 2 levels of wavelet decomposition |
| 3 | 011 | use 3 levels of wavelet decomposition |
| 4 | 100 | use 4 levels of wavelet decomposition |
| 5 | 101 | use 5 levels of wavelet decomposition |
| 6 | 110 | use 6 levels of wavelet decomposition |
| 7 | 111 | use 7 levels of wavelet decomposition |

Factor of Subsampling (FS):

This parameter takes an integer value from 0 to MAXFS. $2^{FS}$ indicates the factor of subsampling used for vector transform. When FS=0, $2^{FS}=1$ indicates no subsampling is performed. For example, if the maximum FS value is chosen to be MAXFS =7, three bits are needed for coding this parameter as follows:

| FS value | Fs code | meaning |
|---|---|---|
| 0 | 000 | no subsampling |
| 1 | 001 | subsampling by a factor of 2 |
| 2 | 010 | subsampling by a factor of 4 |
| 3 | 011 | subsampling by a factor of 8 |
| 4 | 100 | subsampling by a factor of 16 |
| 5 | 101 | subsampling by a factor of 32 |
| 6 | 110 | subsampling by a factor of 64 |
| 7 | 111 | subsampling by a factor of 128 |

Method of Quantization (MQ):

In the present example, this parameter takes a value of either 0 or 1 as shown in the following table:

| MQ value | meaning |
|---|---|
| 0 | use lattice VQ |
| 1 | use transformed lattice VQ |

As an example, a description of an 8×8 transformed Z lattice vector quantization (VQ) technique can be summarized as follows:
  each 8×8 vector is transformed into a different coordinate system so that the distribution boundary comes rectangular. For example, an 8×8 DCT transform can be used;
  the transformed vector is quantized using a $Z_{64}$ lattice;
  the coordinate values of the closest $Z_{64}$ lattice point is ordered into a 1-D sequence according to a zig-zag scan;
  the 1-D sequence is runlength and entropy coded;
  the coded bitstream becomes the index of the 8×8 vector.

A combination of the three above-described parameters indicates a particular coding method. For example, the following coding methods can be covered:

DCT-Based Coding as Used in the Current Standards:

Set LD=0, FS=0, and MQ=0. The DCT is used instead of wavelet because LD=0. No subsampling is performed because FS=0. Lattice VQ becomes uniform scalar quantization when vector dimension becomes 1. Therefore, MQ=0 means uniform scalar quantization when FS=0 ($2^{FS}=1$)

Wavelet-Based Coding:

The only difference between this case and the previous one is to set LD=a non-zero integer. For example, a 3-level wavelet decomposition plus uniform scalar quantization would have LD=3, FS=0, and MQ=0.

Vector Wavelet Coding Using $\Lambda_{16}$ Lattice VQ:

In this case, LD is still a non-zero integer and FS also becomes a non-zero integer. Because $\Lambda_{16}$ lattice VQ is used, FS should be set to 2 so that subsampling of 4×4 is performed. For example, a 3-level vector wavelet decomposition plus $\Lambda_{16}$ lattice VQ would have LD=3, FS=2, and MQ=0.

Vector Wavelet Coding Using Transformed Z Lattice VQ:

This case is the same as the previous one except lattice VQ is replaced with transformed lattice VQ. For example, a 3-level vector wavelet decomposition plus 8×8 transformed lattice VQ would have LD=3, FS=3, and MQ=1.

Vector DCT Coding Using Transformed Z Lattice VQ:

This case is the same as the previous one except wavelet is replaced with DCT. For example, if an 8×8 transformed lattice VQ is still used, the parameters should be LD=0, FS=3; and MQ=1.

Figure 2:
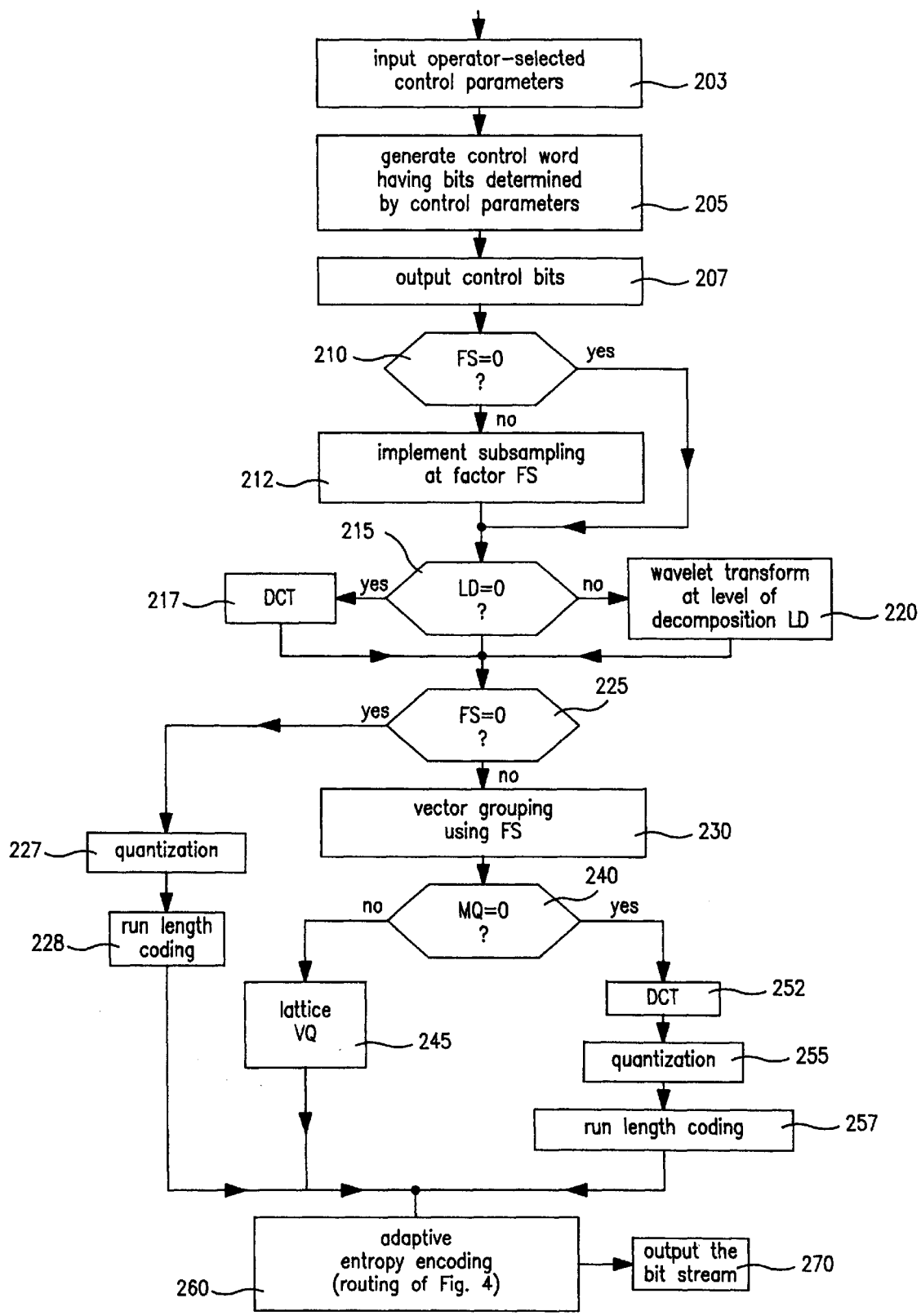
FIG. 2 is a flow diagram of a routine that can be utilized to program the encoder processor in accordance with an embodiment of the invention.

FIG. 2 is a flow diagram of a routine that can be utilized to program the encoder processor in accordance with an embodiment of the invention. The block 203 represents the inputing of operator selected control parameters, that is, the selected values of the parameters LD, FS, and MQ, as described above. A digital control word or signal, in this case seven bits (3 bits for LD, 3 bits for FS, and 1 bit for MQ) is generated as representing the control parameters (block 205). The control bits can then be output (block 207), such as to an output register, for inclusion such as in the header of the bit stream.

Inquiry is then made (decision block 210) as to whether FS is 0. If so, in this example, vector transform (VT) coding is not being used, and the block 215 is entered directly. If not, the block 212 is entered and subsampling is implemented at the factor FS. Inquiry is then made (decision block 215) as to whether LD is 0. If so, digital cosine transform (DCT) is being used and the block 217 is entered for implementation of DCT. If not, the block 220 is entered, this block representing implementation of wavelet transform using a number of levels of wavelet decomposition determined by LD.

Inquiry is then made (decision block 225) as to whether FS is 0. If so, as previously noted, VT coding is not being used, quantization (block 227) and run length coding (block 228) are implemented and the block 260 is then entered. If not, the block 230 is entered, this block representing vector grouping in accordance with FS. Inquiry is then made (decision block 240) as to whether MQ is 0. If so, lattice VQ is implemented, as represented by the block 245. If not, transformed lattice VQ, which involves, in the context of vector transform, DCT of the grouped vectors (which have already been DCTed or wavelet transformed), followed by quantization (e.g. scalar quantization using Z-lattice) and run length coding, these functions being represented by the blocks 252, 255, and 257, respectively. Entropy coding can then be implemented (block 260), followed by outputting of the bit stream, as represented by the block 270. In the present embodiment, adaptive entropy coding is employed, as described in conjunction with the routine of FIG. 4.

Figure 3:
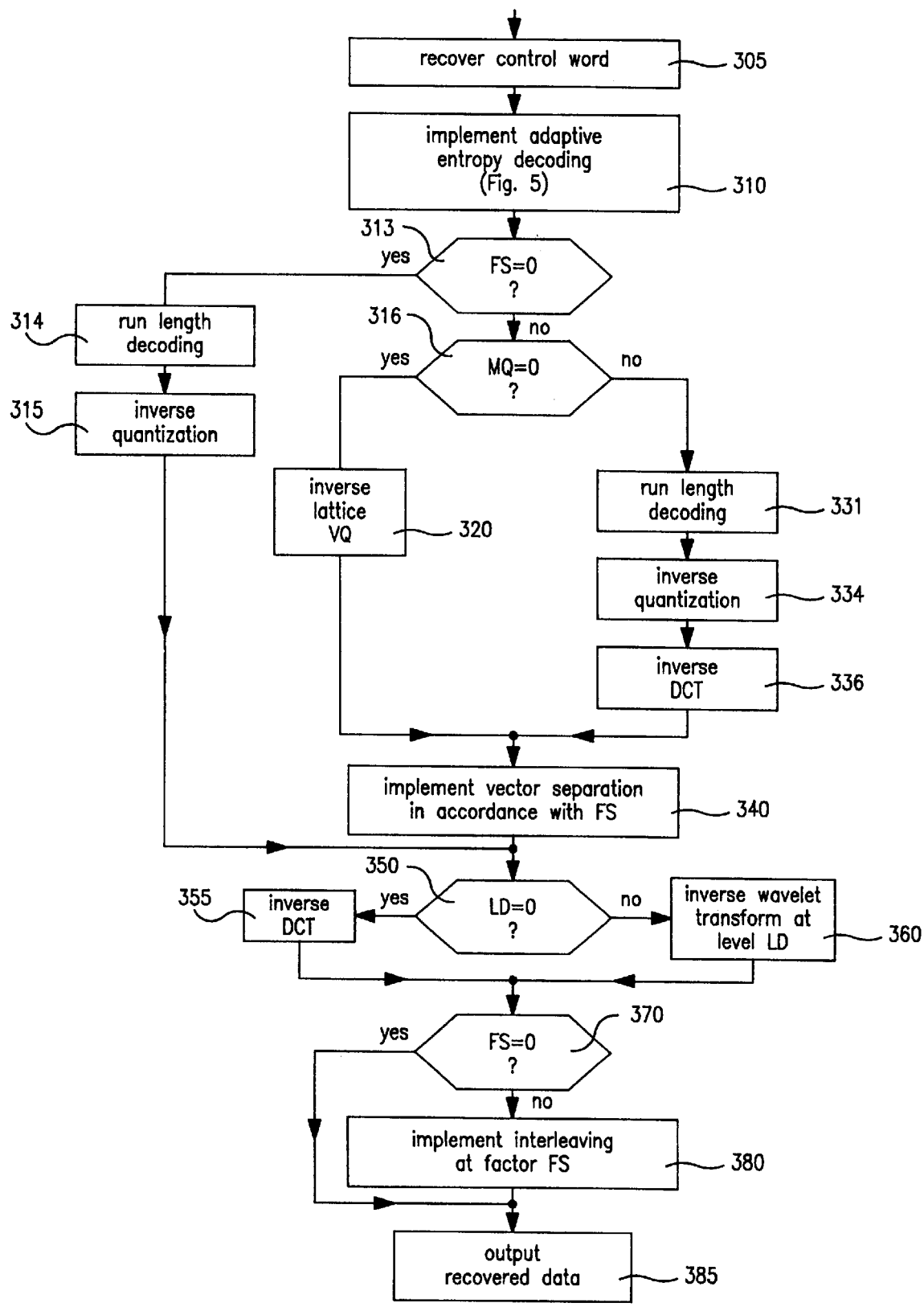
FIG. 3 is a flow diagram of a routine that can be utilized to program the decoder processor in accordance with an embodiment of the invention.

Referring to FIG. 3, there is shown a flow diagram of an embodiment of a routine that can be utilized to program the decoder processor in accordance with an embodiment of the invention. The block 305 represents recovering the control bits from the received data, and the block 310 represents entropy decoding on the received bit stream. In an embodiment hereof, the entropy decoding can be adaptive entropy decoding as described in conjunction with the routine illustrated in the flow diagram of FIG. 5. Inquiry is made (decision block 313) as to whether FS is 0. If so, vector transform (VT) was not implemented at the encoder, run-length decoding (block 314) and inverse quantization (block 315) are implemented and the block 350 is then entered. If not, the decision block 316 is entered and inquiry is made as to whether MQ is 0. If so, inverse lattice VQ is implemented, as represented by the block 320. If not, an inverse of transformed lattice VQ is implemented as represented by the blocks 331, 334 and 336. In particular, these blocks are the inverse of the blocks 257, 255, and 252 of the encoder; namely, run length decoding (block 331), inverse scalar quantization (block 334) and inverse DCT (block 336). Vector separation of the vector groups, in accordance with FS, is then implemented, as represented by the block 340.

Inquiry is then made (decision block 350) as to whether LD is 0. If so, inverse DCT is implemented, as represented by the block 355. If not, inverse wavelet transform is implemented, at a level determined by LD, as represented by the block 360. Inquiry is then made (decision block 370) as to whether FS is 0. If so, VT has not be employed, and the block 385 is entered directly. If not, the block 380 is entered, this block representing the interleaving (the inverse of subsampling) at a factor determined by FS, whereupon the block 385 is entered. The block 385 represents outputting of the now recovered data, such as for video display and/or recording.

Figure 4:
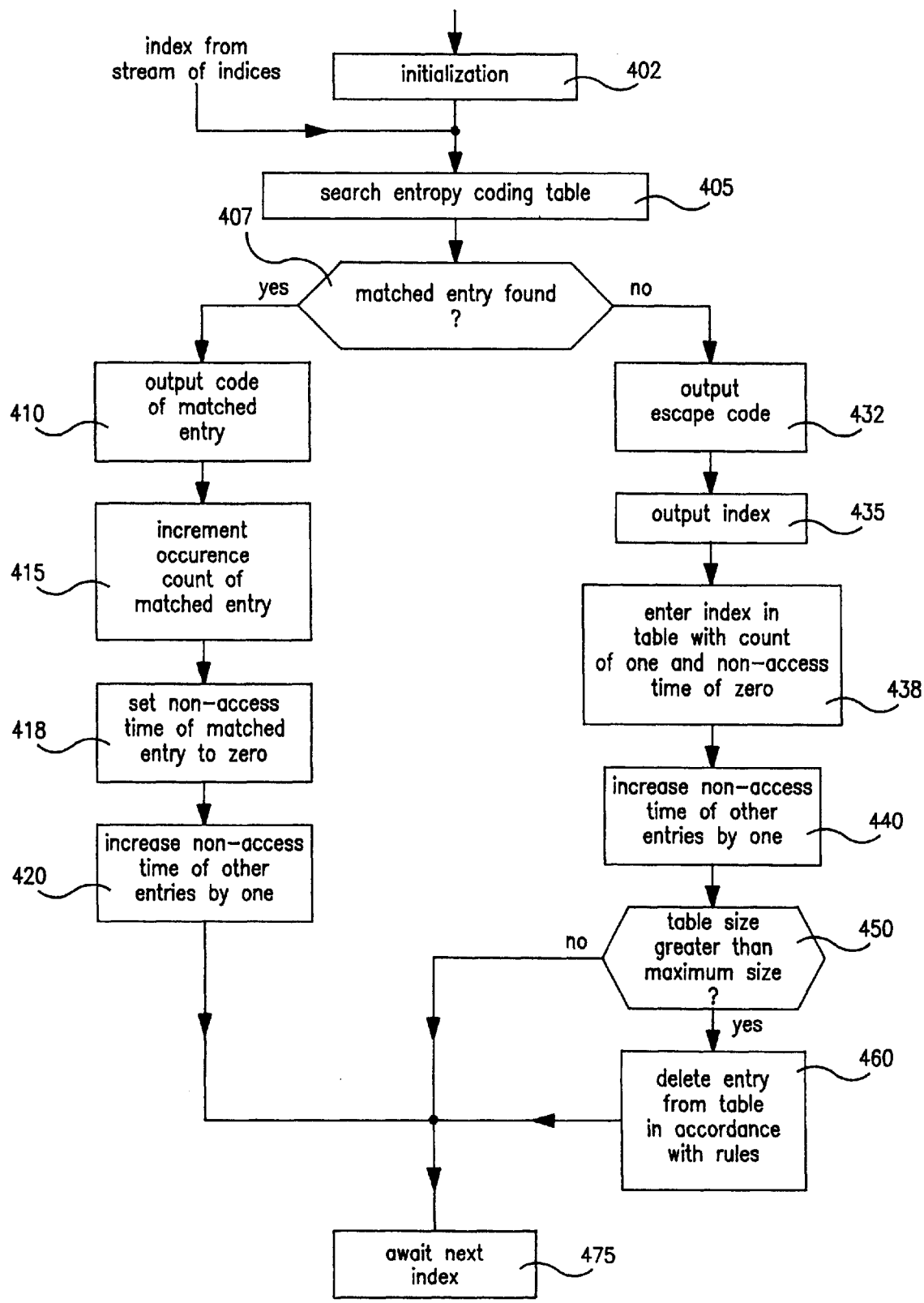
FIG. 4 is a flow diagram of an embodiment of a routine for adaptive entropy coding.

FIG. 4 is a flow diagram of a routine for controlling the encoder processor to implement the optional adaptive entropy encoding in accordance with an embodiment of the invention. The block 402 represents making any desired initial settings, for example setting of initial matched entry counts for data indices in an encoder table and also setting any initial non-access times (or cycle counts) for entries in the table. Next, for a received index of the data stream to be encoded, the entropy coding table is searched (block 405), and determination is made (block 407) as to whether a matched entry is found (i.e., whether there is a stored code for this index). If so, the code is output (block 410) for ultimate receipt by the decoder. Then, the count of matched entries for that code (or index) is increased by one (block 415) and the non-access time (or cycle count) of the matched entry is set to zero (block 418). Also, the non-access time (or cycle count) of other entries in the table are increased by one, as represented by the block 420. The next index of the input stream of indices is then awaited (block 475).

If a matched entry was not found, an escape code (which is a predetermined code that tells the decoder that the symbol will not be found in its table) is output (block 432), followed by outputting of the index itself (block 435). The index is then entered into the table with a matched entry count of one-and a non-access time (or cycle count) of zero (block 438). The non-access time (or cycle count) of other entries in the table are then incremented by one (block 440). Inquiry is then made as to whether the table size is greater than a predetermined maximum size (decision block 450). If not, the block 475 is entered and the next index is awaited. If so, an entry is deleted from the table (block 460), namely, the entry with the largest non-access time (or cycle count). When there is more than one (that is, a tie), the one with the smallest matched entry count is selected for deletion. The block 475 is then entered.

Figure 5:
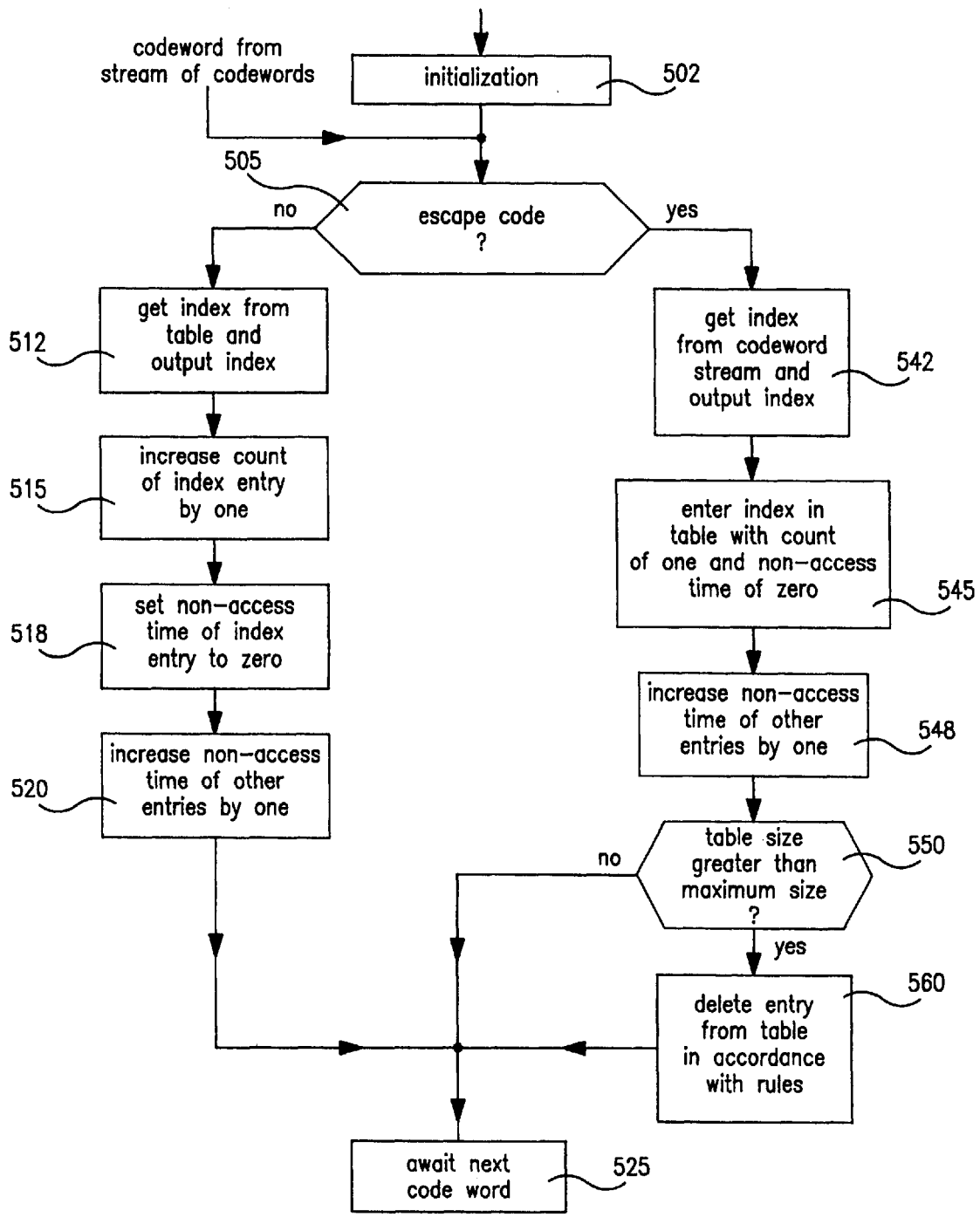
FIG. 5 is a flow diagram of an embodiment of a routine for adaptive entropy decoding.

FIG. 5 shows a flow diagram of a routine for programming the decoder processor to implement the optional adaptive entropy decoding. The block 502 represents any necessary table initialization for correspondence with the encoder coding table. As will be described further, the procedure in the decoder maintains correspondence between the decoder coding table and the encoder coding table. A code word of the stream of index-representative code words is received, and determination is made (decision block 505) as to whether the code word is an escape code. If not, the corresponding index is fetched from the table and output (block 512). Next, operations are performed as represented by blocks 515, 518 and 520, which respectively correspond to their counterpart blocks 415, 418 and 420 of the encoder. Specifically, the count of the index entry is incremented (block 515), the non-access time (or cycles count) is set to zero (block 518), and the non-access time (or cycles count) of the other entries are increased by one (block 520). The next code word is then awaited (block 525).

If it is determined that the received code word is an escape code, the index that follows it is received and output (block 542). The index is then entered in the table with a matched entry count of one and a non-access time (or cycles count) of zero (block 545). Then, the non-access time (or cycles count) of the other entries of the table are increased by one (block 548). Determination is then made (decision block 550) as to whether the predetermined maximum table size has been reached. If not, the block 525 is entered and the next code word is awaited. If so, an entry is deleted from the table in accordance with the previously described deletion rules, as represented by the block 560. The block 525 is then entered.

What is claimed is:

1. A method of encoding and decoding an image, comprising the steps of:

subsampling the image to obtain a plural number of subsampled frames of spatially offset image-representative signals;

transforming each of said subsampled frames to obtain a corresponding number of frames of transform coefficient-representative signals;

forming vector-representative signals from corresponding coefficient-representative signals of the respective frames of coefficient-representative signals;

transforming said vector-representative signals;

quantizing the transformed vector-representative signals to obtain encoded signals;

transmitting the encoded signals;

receiving the transmitted encoded signals; and decoding the encoded signals to obtain a recovered version of said image.

\* \* \* \* \*